US012771647B2

(12) United States Patent
Yu et al.

(10) Patent No.: US 12,771,647 B2
(45) Date of Patent: Oct. 20, 2026

(54) SYSTEMS AND METHODS FOR PROTOCOL DATA UNIT (PDU) SET DISCARD

(71) Applicant: Meta Platforms Technologies, LLC, Menlo Park, CA (US)

(72) Inventors: Liwen Yu, Santa Clara, CA (US); Curt Wong, Bellevue, WA (US); Zhu Ji, Cupertino, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/767,574

(22) Filed: Jul. 9, 2024

(65) Prior Publication Data

US 2025/0055806 A1 Feb. 13, 2025

Related U.S. Application Data

(60) Provisional application No. 63/531,917, filed on Aug. 10, 2023.

(51) Int. Cl.
*H04L 47/32* (2022.01)
*H04L 47/11* (2022.01)
(Continued)

(52) U.S. Cl.
CPC .............. *H04L 47/32* (2013.01); *H04L 47/11* (2013.01); *H04L 47/265* (2022.05); *H04W 28/0278* (2013.01)

(58) Field of Classification Search
CPC ....... H04L 47/32; H04L 47/265; H04L 47/11; H04W 28/0278
See application file for complete search history.

(56) References Cited

U.S. PATENT DOCUMENTS

2022/0361175 A1 11/2022 Hou et al.
2024/0015848 A1 1/2024 Jeong et al.
(Continued)

FOREIGN PATENT DOCUMENTS

CN 116261173 A 6/2023
WO 2023029016 A1 3/2023
WO 2023081152 A1 5/2023

OTHER PUBLICATIONS

"3rd Generation Partnership Project; Technical Specification Group Services and System Aspects; Study on XR (Extended Reality) And Media Services (Release 18)," 3GPP Draft 3rd Generation Partnership Project (3GPP), Jan. 22, 2023, 266 Pages, Retrieved from the Internet URL: https://www.3gpp.org/ftp/tsg_sa/WG2Arch/TSGS2154AHEElectronic2023-01/Docs/S2-2301372.zip23700-60-i00.zip23700-60-i00.docx.

(Continued)

*Primary Examiner* — Nazia Naoreen
(74) *Attorney, Agent, or Firm* — Foley & Lardner LLP

(57) ABSTRACT

Systems and methods for protocol data unit (PDU) set discard may include a transmitter device which determines, for each of a plurality of PDU sets, a discard level, from an ordered set of a plurality of discard levels, assigned to the PDU set, the discard level assigned to the PDU set based on one or more characteristics of traffic corresponding to the PDU set. The transmitter device may determine a congestion status of a network which is to be used to transmit the PDU sets to a receiver device. The transmitter device may discard a first subset of the plurality of PDU sets, according to a first discard level assigned to the first subset. The transmitter device may transmit, via the network to the receiver device, a second subset of the plurality of PDU sets having a second discard level.

20 Claims, 8 Drawing Sheets

(51) Int. Cl.
*H04L 47/265* (2022.01)
*H04W 28/02* (2009.01)

(56) References Cited

U.S. PATENT DOCUMENTS

| | | | | |
|---|---|---|---|---|
| 2024/0039678 | A1 | 2/2024 | Rodriguez Fernandez et al. | |
| 2024/0179737 | A1 | 5/2024 | Tsai et al. | |
| 2024/0275732 | A1* | 8/2024 | He | H04L 47/32 |
| 2024/0284253 | A1* | 8/2024 | Kuo | H04L 47/32 |
| 2025/0088895 | A1* | 3/2025 | Löhr | H04W 28/0236 |
| 2025/0379828 | A1* | 12/2025 | Kang | H04L 41/0806 |
| 2026/0006503 | A1* | 1/2026 | Wang | H04L 47/34 |

OTHER PUBLICATIONS

Chen Y., et al., "PDU Set Level Discard," 3GPP TSG-RAN WG2 #121 R2-2301010, vol. RAN WG2, No. Athens, Feb. 16, 2023, 3 Pages, Retrieved from the Internet URL: https://www.3gpp.org/ftp/TSG%20RAN/WG2%20R%20L2/TSGR2%20121/Docs/R2-2301010.%20zipR2-2301010.docx.

European Search Report for European Patent Application No. 24192053.7, dated Nov. 25, 2024, 10 pages.

European Search Report for European Patent Application No. 24192061.0, dated Dec. 3, 2024, 9 pages.

European Search Report for European Patent Application No. 24192178.2, dated Dec. 5, 2024, 9 pages.

European Search Report for European Patent Application No. 24192190.7 , dated Jan. 13, 2025, 7 pages.

Huawei., et al., "On Sidelink CA," 3GPP TSG-RAN WG4 Meeting #107 R4-2308607, May 15, 2023, vol. 3GPP RAN 4, No. Incheon, 6 Pages, Retrieved from the Internet URL: https://ftp.3gpp.org/tsg_ran/WG4_Radio/TSGR4107/Docs/R4-2308607.zipR4-2308607OnsidelinkCA.docx.

Intel Corporation., "Discard Operation for XR," 3GPP TSG RAN WG2 Meeting #121bis-e R2-2302912, vol. 3GPP RAN 2, No. Online, Apr. 7, 2023, 7 Pages, Retrieved from the Internet URL: https://www.3gpp.org/ftp/tsg_ran/WG2_RL2/T%20SGR2%20121bis-e/Docs/R2-2302912.zipR2-2302912-R18XRDiscardOperationforXR.docx.

Nagano T., et al., "Discussion on Delay Status Reporting for XR," 3GPP TSG-RAN WG2 #123 R2-2307243, Aug. 9, 2023, [Retrieved on Sep. 8, 2023], vol. RAN WG2, No. Toulouse, 3 Pages, Retrieved from the Internet URL: https://www.3gpp.org/ftp/TSG_RAN/WG2_RL2/TSGR2_123/%20Docs/R2-2307243.zip%20R2-2307243.docx.

Qualcomm Incorporated., "BSR and Delay Status Reporting for XR," 3GPP TSG-RAN WG2 Meeting #122 R2-2304711, May 12, 2023, [Retrieved on Dec. 5, 2023], vol. 3GPP RAN 2, No. Incheon, 6 Pages, Retrieved from the Internet URL: https://www.3gpp.org/ftp/tsg_ran/WG2_RL2/TSGR2_122/Docs/%20R2-2304711.zip% 20R2-2304711BSRanddelaystatusreprotingforXR.docx.

Wu J., et al., "Remove the ENs About Whether PDU Set Importance Can Span Across QoS Flows," SA WG2 Meeting #156e S2-2305186, vol. SA WG2, No. Online, Apr. 7, 2023, 3 Pages, Retrieved from the Internet URL: https://www.3gpp.org/ftp/tsg_sa/WG2%20Ar%20ch/TSGS2%20156E%20Electronic%202023-04/Docs/S2-2%20305186.zip%20S2-2305186KI#4%2023.501RemovetheENsaboutwhetherPDUSetImportancecanspanacrossQoSFlows.docx.

Yang Y., et al., "Discussion on XR Awareness," 3GPP TSG-RAN WG2 Meeting #121-Bis Electronic R2-2302938, Apr. 7, 2023, vol. RAN WG2, No. Online, 5 Pages, Retrieved from the Internet URL: https://www.3gpp.org/ftp/TSG_RAN/WG2_RL2/TSGR2_121bis-e/Docs/R2-2302938.zipR2-2302938DiscussiononXRawareness.docx.

* cited by examiner

250

SYSTEMS AND METHODS FOR PROTOCOL DATA UNIT (PDU) SET DISCARD

CROSS-REFERENCE TO RELATED APPLICATIONS

This application claims the benefit of and priority to U.S. Application No. 63/531,917, filed Aug. 10, 2023, the contents of which are incorporated herein by reference in their entirety.

FIELD OF DISCLOSURE

The present disclosure is generally related to wireless communication between devices, including but not limited to, systems and methods for protocol data unit (PDU) set discard.

BACKGROUND

Augmented reality (AR), virtual reality (VR), and mixed reality (MR) are becoming more prevalent, which such technology being supported across a wider variety of platforms and device. Some AR/VR/MR devices may communicate with other devices within an environment via various cellular connections or links.

SUMMARY

In one aspect, this disclosure is directed to a method. The method may include determining, by a transmitter device, for each of a plurality of protocol data unit (PDU) sets, a discard level, from an ordered set of a plurality of discard levels, assigned to the PDU set. The discard level may be assigned to the PDU set based on one or more characteristics of traffic corresponding to the PDU set. The transmitter device may determine a congestion status of a network which is to be used to transmit the PDU sets to a receiver device. The transmitter device may discard a first subset of the plurality of PDU sets, according to a first discard level assigned to the first subset. The transmitter device may transmit, via the network to the receiver device, a second subset of the plurality of PDU sets having a second discard level.

In some embodiments, the ordered set of the plurality of discard level includes the first discard level, the second discard level, and a third discard level. In some embodiments, discarding the first subset of the plurality of PDU sets includes purging the first subset from a buffer of the transmitter device. In some embodiments, the transmitter device includes at least one of a user equipment (UE) or a base station. In some embodiments, the discard level is assigned to the PDU set at an application layer of a user equipment (UE), and the UE includes the transmitter device, which corresponds to a physical layer of the UE.

In some embodiments, the discard level is assigned by a source device, including at least one of a user equipment (UE) or an application server, and the transmitter device includes at least one of a network node along a network path between the UE and the application server. In some embodiments, the first discard level indicates to discard a corresponding PDU set irrespective of a PDU set importance (PSI) assigned to the corresponding PDU set, the second discard level indicates to discard a corresponding PDU set following discarding of PDU sets assigned the first discard level, and a third discard level indicates to discard a corresponding PDU set following discarding of PDU sets assigned the second discard level. In some embodiments, the one or more characteristics include at least one of a data rate, a reliability-sensitivity, and/or a latency-sensitivity. In some embodiments, the transmitter device transmits, via the network to the receiver device, a third subset of the plurality of PDU sets having a third discard level.

In another aspect, this disclosure is directed to a transmitter device including a wireless transceiver and one or more processors configured to determine, for each of a plurality of protocol data unit (PDU) sets, a discard level, from an ordered set of a plurality of discard levels, assigned to the PDU set. The discard level may be assigned to the PDU set based on one or more characteristics of traffic corresponding to the PDU set. The one or more processors may be configured to determine a congestion status of a network which is to be used to transmit the PDU sets to a receiver device. The one or more processors may be configured to discard a first subset of the plurality of PDU sets, according to a first discard level assigned to the first subset. The one or more processors may be configured to transmit, via the wireless transceiver and the network to the receiver device, a second subset of the plurality of PDU sets having a second discard level.

In some embodiments, the ordered set of the plurality of discard level includes the first discard level, the second discard level, and a third discard level. In some embodiments, the one or more processors are configured to discard the first subset of the plurality of PDU sets by purging the first subset from a buffer of the transmitter device. In some embodiments, the discard level is assigned to the PDU set at an application layer of a user equipment (UE), and the UE includes the transmitter device, which corresponds to a physical layer of the UE. In some embodiments, the discard level is assigned by a source device, including at least one of a user equipment (UE) or an application server, and the transmitter device includes a network node along a network path between the UE and the application server.

In some embodiments, the first discard level indicates to discard a corresponding PDU set irrespective of a PDU set importance (PSI) assigned to the corresponding PDU set, the second discard level indicates to discard a corresponding PDU set following discarding of PDU sets assigned the first discard level, and a third discard level indicates to discard a corresponding PDU set following discarding of PDU sets assigned the second discard level. In some embodiments, the one or more processors are further configured to transmit, via the wireless transceiver and the network to the receiver device, a third subset of the plurality of PDU sets having a third discard level. In some embodiments, at least one of a base station, a network device, or a UE may include the transmitter device.

In yet another aspect, this disclosure is directed to a non-transitory computer readable medium storing instructions that, when executed by one or more processors of a transmitter device, cause the transmitter device to determine, for each of a plurality of protocol data unit (PDU) sets, a discard level, from an ordered set of a plurality of discard levels, assigned to the PDU set. The discard level may be assigned to the PDU set based on one or more characteristics of traffic corresponding to the PDU set. The instructions may cause the transmitter device to determine a congestion status of a network which is to be used to transmit the PDU sets to a receiver device. The instructions may cause the transmitter device to discard a first subset of the plurality of PDU sets, according to a first discard level assigned to the first subset. The instructions may cause the transmitter device to transmit, via a wireless transceiver and the network to the receiver device, a second subset of the plurality of PDU sets having a second discard level.

In some embodiments, the instructions further cause the transmitter device to transmit, via the wireless transceiver and the network to the receiver device, a third subset of the plurality of PDU sets having a third discard level. In some embodiments, the first discard level indicates to discard a corresponding PDU set irrespective of a PDU set importance (PSI) assigned to the corresponding PDU set, the second discard level indicates to discard a corresponding PDU set following discarding of PDU sets assigned the first discard level, and the third discard level indicates to discard a corresponding PDU set following discarding of PDU sets assigned the second discard level.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
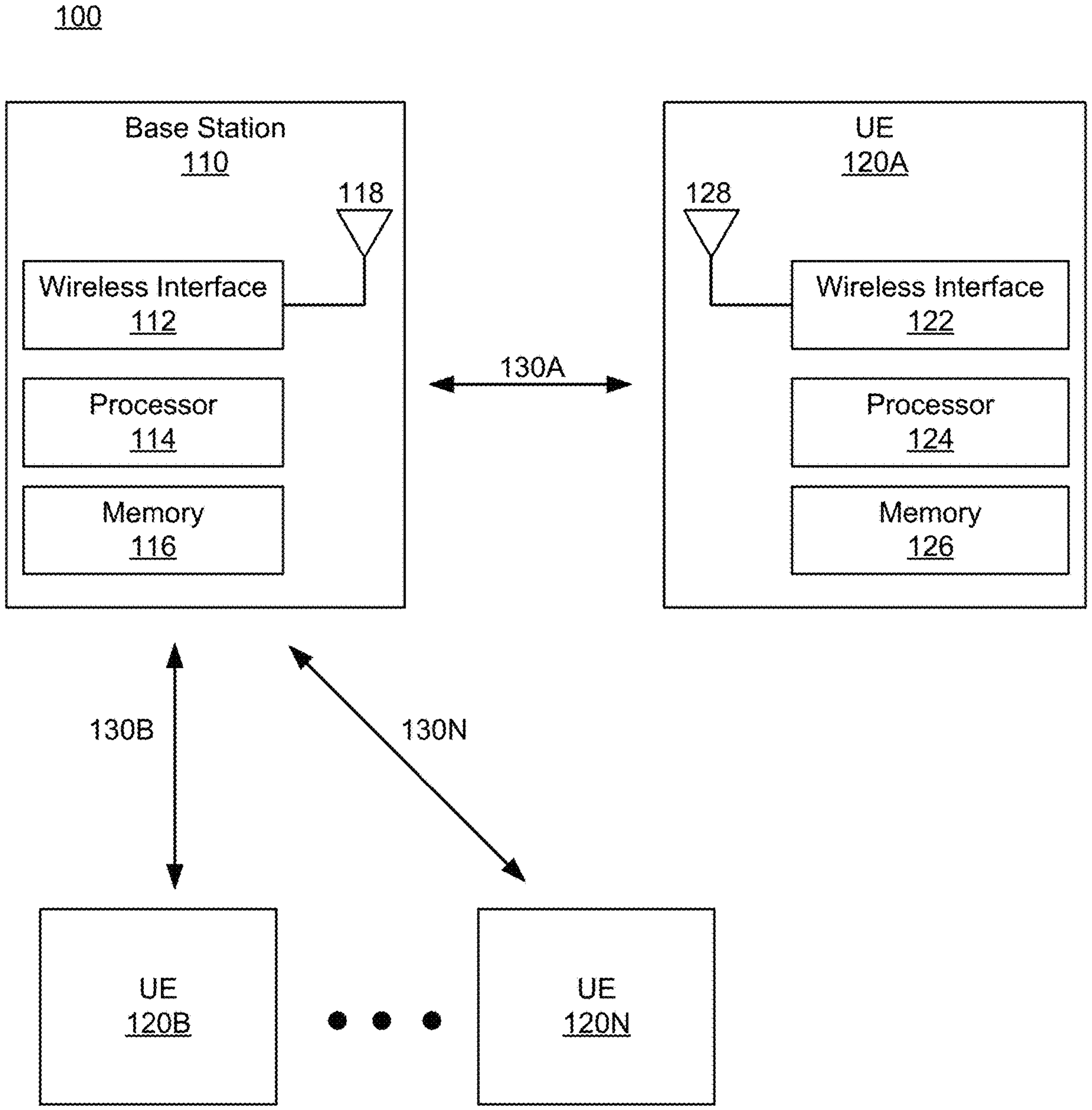
FIG. 1 is a diagram of an example wireless communication system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, the systems and methods described herein may implement protocol data unit (PDU) set discarding. A PDU set may include one or more PDUs which carry the payload of a unit of information generated at an application layer of a source device. For example, within the context of extended reality (XR) applications, a PDU may carry a frame or video slice for an XR application. In some implementations, each of the PDUs in a PDU set may be needed by a receiver-application layer to use the corresponding unit of information. In other implementations, the receiver-application layer may still recover parts (or all) of the information unit, even when some PDUs are missing/dropped/discarded. However, if at least one packet associated with the PDU set is not transmitted, the PDU set may not be decodable. As such, PDU discard may be applied on a PDU set basis (e.g., as opposed to on a per-PDU basis, which could result in undecodable PDU sets anyways).

Some implementations may use a PDU set importance (PSI) assigned to a PDU set, for PDU set level packet discarding. However, such a PSI may be binary, and may not account for differentiated discard operations based on traffic characteristics and network conditions.

According to the systems and methods described herein, when a network is under congestion, a discard operation may be based on a discard level assigned to PDU sets. The discard level may be assigned from a plurality of (e.g., non-binary, ordered, etc.) discard levels, which establish discard ranking(s) for the PDU sets. When a network is not under congestion, a transmitter device may set a discard timer according to or based on latency metrics/characteristics for the traffic, which can provide a unified approach while treating PDU sets differently based on latency. However, where a network is under congestion, the transmitter device may discard PDU sets in order based on the discard level. This can improve network congestion performance by discarding based on traffic type, as opposed to importance (which may not have as great of an impact on improving congestion).

The systems and methods may improve congestion performance by reducing the network load through discarding according to discard levels. For example, by discarding PDU sets according to packet size (e.g., discarding large packet sizes) or data rate (e.g., high data rate), the network congestion may improve quickly. Additionally, by foregoing discarding PDU sets which are most important (or delaying their discard until other, less important PDU sets are discarded first), the systems and methods described herein can ensure that more important PDU sets (e.g., including or containing high-reliability information) are not discarded under network congestion.

Additional details of the present solution, as well as various technical benefits, are provided in greater detail below.

FIG. 1 illustrates an example wireless communication system 100. The wireless communication system 100 may include a base station 110 (also referred to as "a wireless communication node 110" or "a station 110") and one or more user equipment (UEs) 120 (also referred to as "wireless communication devices 120" or "terminal devices 120"). The base station 110 and the UEs 120 may communicate through wireless commination links 130A, 130B, 130C. The wireless communication link 130 may be a cellular communication link conforming to 3G, 4G, 5G or other cellular communication protocols or a Wi-Fi communication protocol. In one example, the wireless communication link 130 supports, employs or is based on an orthogonal frequency division multiple access (OFDMA). In one aspect, the UEs 120 are located within a geographical boundary with respect to the base station 110, and may communicate with or through the base station 110. In some embodiments, the wireless communication system 100 includes more, fewer, or different components than shown in FIG. 1. For example, the wireless communication system 100 may include one or more additional base stations 110 than shown in FIG. 1.

In some embodiments, the UE 120 may be a user device such as a mobile phone, a smart phone, a personal digital assistant (PDA), tablet, laptop computer, wearable computing device, etc. Each UE 120 may communicate with the base station 110 through a corresponding communication link 130. For example, the UE 120 may transmit data to a base station 110 through a wireless communication link 130, and receive data from the base station 110 through the wireless communication link 130. Example data may include audio data, image data, text, etc. Communication or transmission of data by the UE 120 to the base station 110 may be referred to as an uplink communication. Communication or reception of data by the UE 120 from the base station 110 may be referred to as a downlink communication. In some embodiments, the UE 120A includes a wireless interface 122, a processor 124, a memory device 126, and one or more antennas 128. These components may be embodied as hardware, software, firmware, or a combination thereof. In some embodiments, the UE 120A includes more, fewer, or different components than shown in FIG. 1. For example, the UE 120 may include an electronic display and/or an input device. For example, the UE 120 may include additional antennas 128 and wireless interfaces 122 than shown in FIG. 1.

The antenna 128 may be a component that receives a radio frequency (RF) signal and/or transmit a RF signal through a wireless medium. The RF signal may be at a frequency between 200 MHz to 100 GHz. The RF signal may have packets, symbols, or frames corresponding to data for communication. The antenna 128 may be a dipole antenna, a patch antenna, a ring antenna, or any suitable antenna for wireless communication. In one aspect, a single antenna 128 is utilized for both transmitting the RF signal and receiving the RF signal. In one aspect, different antennas 128 are utilized for transmitting the RF signal and receiving the RF signal. In one aspect, multiple antennas 128 are utilized to support multiple-in, multiple-out (MIMO) communication.

The wireless interface 122 includes or is embodied as a transceiver for transmitting and receiving RF signals through a wireless medium. The wireless interface 122 may communicate with a wireless interface 112 of the base station 110 through a wireless communication link 130A. In one configuration, the wireless interface 122 is coupled to one or more antennas 128. In one aspect, the wireless interface 122 may receive the RF signal at the RF frequency received through antenna 128, and downconvert the RF signal to a baseband frequency (e.g., 0~1 GHz). The wireless interface 122 may provide the downconverted signal to the processor 124. In one aspect, the wireless interface 122 may receive a baseband signal for transmission at a baseband frequency from the processor 124, and upconvert the baseband signal to generate a RF signal. The wireless interface 122 may transmit the RF signal through the antenna 128.

The processor 124 is a component that processes data. The processor 124 may be embodied as field programmable gate array (FPGA), application specific integrated circuit (ASIC), a logic circuit, etc. The processor 124 may obtain instructions from the memory device 126, and executes the instructions. In one aspect, the processor 124 may receive downconverted data at the baseband frequency from the wireless interface 122, and decode or process the downconverted data. For example, the processor 124 may generate audio data or image data according to the downconverted data, and present an audio indicated by the audio data and/or an image indicated by the image data to a user of the UE 120A. In one aspect, the processor 124 may generate or obtain data for transmission at the baseband frequency, and encode or process the data. For example, the processor 124 may encode or process image data or audio data at the baseband frequency, and provide the encoded or processed data to the wireless interface 122 for transmission.

The memory device 126 is a component that stores data. The memory device 126 may be embodied as random access memory (RAM), flash memory, read only memory (ROM), erasable programmable read-only memory (EPROM), electrically erasable programmable read-only memory (EEPROM), registers, a hard disk, a removable disk, a CD-ROM, or any device capable for storing data. The memory device 126 may be embodied as a non-transitory computer readable medium storing instructions executable by the processor 124 to perform various functions of the UE 120A disclosed herein. In some embodiments, the memory device 126 and the processor 124 are integrated as a single component.

In some embodiments, each of the UEs 120B . . . 120N includes similar components of the UE 120A to communicate with the base station 110. Thus, detailed description of duplicated portion thereof is omitted herein for the sake of brevity.

In some embodiments, the base station 110 may be an evolved node B (eNB), a serving eNB, a target eNB, a femto station, or a pico station. The base station 110 may be communicatively coupled to another base station 110 or other communication devices through a wireless communication link and/or a wired communication link. The base station 110 may receive data (or a RF signal) in an uplink communication from a UE 120. Additionally or alternatively, the base station 110 may provide data to another UE 120, another base station, or another communication device. Hence, the base station 110 allows communication among UEs 120 associated with the base station 110, or other UEs associated with different base stations. In some embodiments, the base station 110 includes a wireless interface 112, a processor 114, a memory device 116, and one or more antennas 118. These components may be embodied as hardware, software, firmware, or a combination thereof. In some embodiments, the base station 110 includes more, fewer, or different components than shown in FIG. 1. For example, the base station 110 may include an electronic display and/or an input device. For example, the base station 110 may include additional antennas 118 and wireless interfaces 112 than shown in FIG. 1.

The antenna 118 may be a component that receives a radio frequency (RF) signal and/or transmit a RF signal through a wireless medium. The antenna 118 may be a dipole antenna, a patch antenna, a ring antenna, or any suitable antenna for wireless communication. In one aspect, a single antenna 118 is utilized for both transmitting the RF signal and receiving the RF signal. In one aspect, different antennas 118 are utilized for transmitting the RF signal and receiving the RF signal. In one aspect, multiple antennas 118 are utilized to support multiple-in, multiple-out (MIMO) communication.

The wireless interface 112 includes or is embodied as a transceiver for transmitting and receiving RF signals through a wireless medium. The wireless interface 112 may communicate with a wireless interface 122 of the UE 120 through a wireless communication link 130. In one configuration, the wireless interface 112 is coupled to one or more antennas 118. In one aspect, the wireless interface 112 may receive the RF signal at the RF frequency received through antenna 118, and downconvert the RF signal to a baseband frequency (e.g., 0~1 GHZ). The wireless interface 112 may provide the downconverted signal to the processor 124. In one aspect, the wireless interface 122 may receive a baseband signal for transmission at a baseband frequency from the processor 114, and upconvert the baseband signal to generate a RF signal. The wireless interface 112 may transmit the RF signal through the antenna 118.

The processor 114 is a component that processes data. The processor 114 may be embodied as FPGA, ASIC, a logic circuit, etc. The processor 114 may obtain instructions from the memory device 116, and executes the instructions. In one aspect, the processor 114 may receive downconverted data at the baseband frequency from the wireless interface 112, and decode or process the downconverted data. For example, the processor 114 may generate audio data or image data according to the downconverted data. In one aspect, the processor 114 may generate or obtain data for transmission at the baseband frequency, and encode or process the data. For example, the processor 114 may encode or process image data or audio data at the baseband frequency, and provide the encoded or processed data to the wireless interface 112 for transmission. In one aspect, the processor 114 may set, assign, schedule, or allocate communication resources for different UEs 120. For example, the processor 114 may set different modulation schemes, time slots, channels, frequency bands, etc. for UEs 120 to avoid interference. The processor 114 may generate data (or UL CGs) indicating configuration of communication resources, and provide the data (or UL CGs) to the wireless interface 112 for transmission to the UEs 120.

The memory device 116 is a component that stores data. The memory device 116 may be embodied as RAM, flash memory, ROM, EPROM, EEPROM, registers, a hard disk, a removable disk, a CD-ROM, or any device capable for storing data. The memory device 116 may be embodied as a non-transitory computer readable medium storing instructions executable by the processor 114 to perform various functions of the base station 110 disclosed herein. In some embodiments, the memory device 116 and the processor 114 are integrated as a single component.

In some embodiments, communication between the base station 110 and the UE 120 is based on one or more layers of Open Systems Interconnection (OSI) model. The OSI model may include layers including: a physical layer, a Medium Access Control (MAC) layer, a Radio Link Control (RLC) layer, a Packet Data Convergence Protocol (PDCP) layer, a Radio Resource Control (RRC) layer, a Non Access Stratum (NAS) layer or an Internet Protocol (IP) layer, and other layer.

Figure 2:
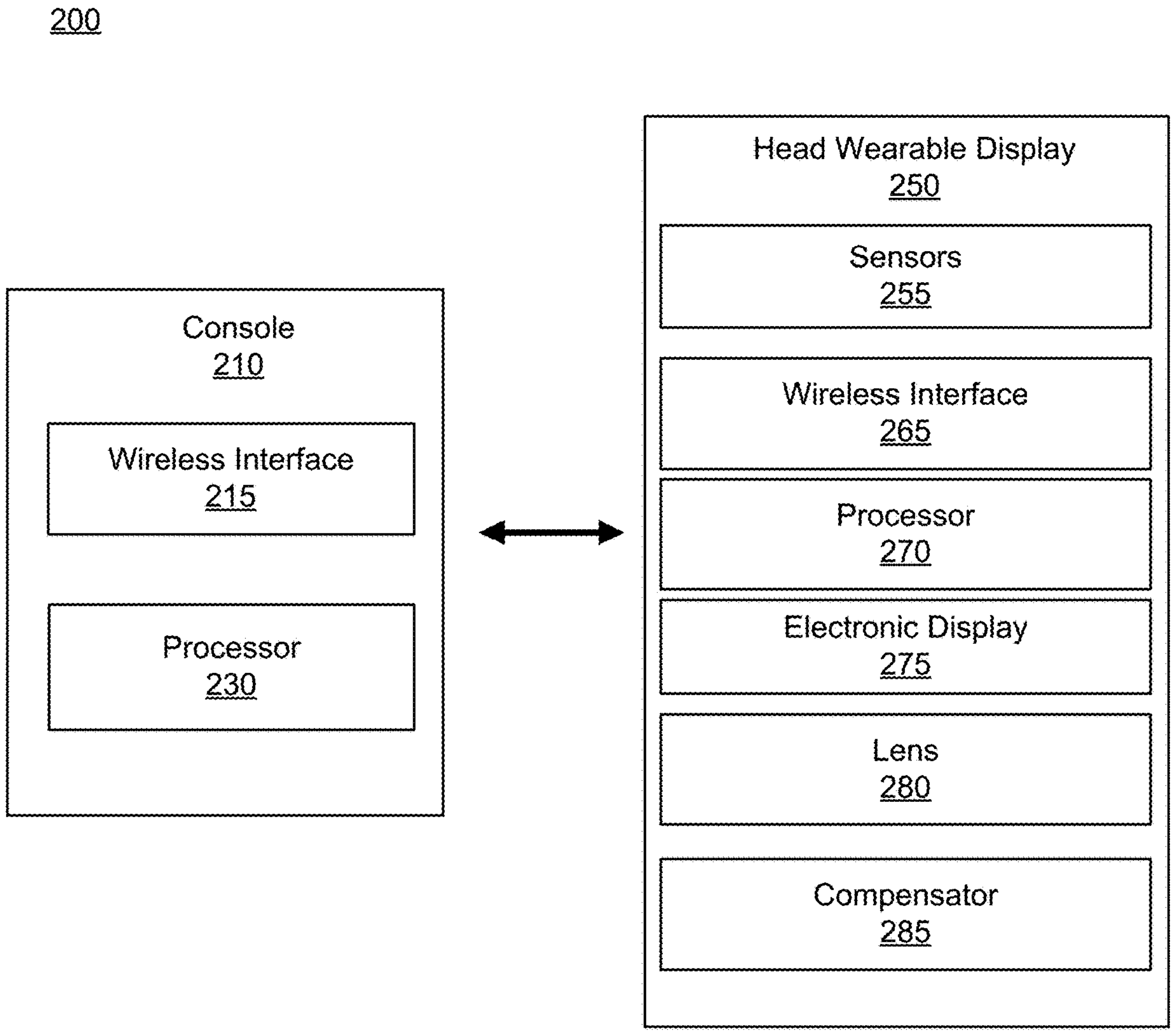
FIG. 2 is a diagram of a console and a head wearable display for presenting augmented reality or virtual reality, according to an example implementation of the present disclosure.

FIG. 2 is a block diagram of an example artificial reality system environment 200. In some embodiments, the artificial reality system environment 200 includes a HWD 250 worn by a user, and a console 210 providing content of artificial reality (e.g., augmented reality, virtual reality, mixed reality) to the HWD 250. Each of the HWD 250 and the console 210 may be a separate UE 120. The HWD 250 may be referred to as, include, or be part of a head mounted display (HMD), head mounted device (HMD), head wearable device (HWD), head worn display (HWD) or head worn device (HWD). The HWD 250 may detect its location and/or orientation of the HWD 250 as well as a shape, location, and/or an orientation of the body/hand/face of the user, and provide the detected location/or orientation of the HWD 250 and/or tracking information indicating the shape, location, and/or orientation of the body/hand/face to the console 210. The console 210 may generate image data indicating an image of the artificial reality according to the detected location and/or orientation of the HWD 250, the detected shape, location and/or orientation of the body/hand/face of the user, and/or a user input for the artificial reality, and transmit the image data to the HWD 250 for presentation. In some embodiments, the artificial reality system environment 200 includes more, fewer, or different components than shown in FIG. 2. In some embodiments, functionality of one or more components of the artificial reality system environment 200 can be distributed among the components in a different manner than is described here. For example, some of the functionality of the console 210 may be performed by the HWD 250. For example, some of the functionality of the HWD 250 may be performed by the console 210. In some embodiments, the console 210 is integrated as part of the HWD 250.

In some embodiments, the HWD 250 is an electronic component that can be worn by a user and can present or provide an artificial reality experience to the user. The HWD 250 may render one or more images, video, audio, or some combination thereof to provide the artificial reality experience to the user. In some embodiments, audio is presented via an external device (e.g., speakers and/or headphones) that receives audio information from the HWD 250, the console 210, or both, and presents audio based on the audio information. In some embodiments, the HWD 250 includes sensors 255, a wireless interface 265, a processor 270, an electronic display 275, a lens 280, and a compensator 285. These components may operate together to detect a location of the HWD 250 and a gaze direction of the user wearing the HWD 250, and render an image of a view within the artificial reality corresponding to the detected location and/or orientation of the HWD 250. In other embodiments, the HWD 250 includes more, fewer, or different components than shown in FIG. 2.

In some embodiments, the sensors 255 include electronic components or a combination of electronic components and software components that detect a location and an orientation of the HWD 250. Examples of the sensors 255 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 255 detect the translational movement and the rotational movement, and determine an orientation and location of the HWD 250. In one aspect, the sensors 255 can detect the translational movement and the rotational movement with respect to a previous orientation and location of the HWD 250, and determine a new orientation and/or location of the HWD 250 by accumulating or integrating the detected translational movement and/or the rotational movement. Assuming for an example that the HWD 250 is oriented in a direction 25 degrees from a reference direction, in response to detecting that the HWD 250 has rotated 20 degrees, the sensors 255 may determine that the HWD 250 now faces or is oriented in a direction 45 degrees from the reference direction. Assuming for another example that the HWD 250 was located two feet away from a reference point in a first direction, in response to detecting that the HWD 250 has moved three feet in a second direction, the sensors 255 may determine that the HWD 250 is now located at a vector multiplication of the two feet in the first direction and the three feet in the second direction.

In some embodiments, the sensors 255 include eye trackers. The eye trackers may include electronic components or a combination of electronic components and software components that determine a gaze direction of the user of the HWD 250. In some embodiments, the HWD 250, the console 210 or a combination of them may incorporate the gaze direction of the user of the HWD 250 to generate image data for artificial reality. In some embodiments, the eye trackers include two eye trackers, where each eye tracker captures an image of a corresponding eye and determines a gaze direction of the eye. In one example, the eye tracker determines an angular rotation of the eye, a translation of the eye, a change in the torsion of the eye, and/or a change in shape of the eye, according to the captured image of the eye, and determines the relative gaze direction with respect to the HWD 250, according to the determined angular rotation, translation and the change in the torsion of the eye. In one approach, the eye tracker may shine or project a predetermined reference or structured pattern on a portion of the eye, and capture an image of the eye to analyze the pattern projected on the portion of the eye to determine a relative gaze direction of the eye with respect to the HWD 250. In some embodiments, the eye trackers incorporate the orientation of the HWD 250 and the relative gaze direction with respect to the HWD 250 to determine a gate direction of the user. Assuming for an example that the HWD 250 is oriented at a direction 30 degrees from a reference direction, and the relative gaze direction of the HWD 250 is −10 degrees (or 350 degrees) with respect to the HWD 250, the eye trackers may determine that the gaze direction of the user is 20 degrees from the reference direction. In some embodiments, a user of the HWD 250 can configure the HWD 250 (e.g., via user settings) to enable or disable the eye trackers. In some embodiments, a user of the HWD 250 is prompted to enable or disable the eye trackers.

In some embodiments, the wireless interface 265 includes an electronic component or a combination of an electronic component and a software component that communicates with the console 210. The wireless interface 265 may be or correspond to the wireless interface 122. The wireless interface 265 may communicate with a wireless interface 215 of the console 210 through a wireless communication link through the base station 110. Through the communication link, the wireless interface 265 may transmit to the console 210 data indicating the determined location and/or orientation of the HWD 250, and/or the determined gaze direction of the user. Moreover, through the communication link, the wireless interface 265 may receive from the console 210 image data indicating or corresponding to an image to be rendered and additional data associated with the image.

In some embodiments, the processor 270 includes an electronic component or a combination of an electronic component and a software component that generates one or more images for display, for example, according to a change in view of the space of the artificial reality. In some embodiments, the processor 270 is implemented as a part of the processor 124 or is communicatively coupled to the processor 124. In some embodiments, the processor 270 is implemented as a processor (or a graphical processing unit (GPU)) that executes instructions to perform various functions described herein. The processor 270 may receive, through the wireless interface 265, image data describing an image of artificial reality to be rendered and additional data associated with the image, and render the image to display through the electronic display 275. In some embodiments, the image data from the console 210 may be encoded, and the processor 270 may decode the image data to render the image. In some embodiments, the processor 270 receives, from the console 210 in additional data, object information indicating virtual objects in the artificial reality space and depth information indicating depth (or distances from the HWD 250) of the virtual objects. In one aspect, according to the image of the artificial reality, object information, depth information from the console 210, and/or updated sensor measurements from the sensors 255, the processor 270 may perform shading, reprojection, and/or blending to update the image of the artificial reality to correspond to the updated location and/or orientation of the HWD 250. Assuming that a user rotated his head after the initial sensor measurements, rather than recreating the entire image responsive to the updated sensor measurements, the processor 270 may generate a small portion (e.g., 10%) of an image corresponding to an updated view within the artificial reality according to the updated sensor measurements, and append the portion to the image in the image data from the console 210 through reprojection. The processor 270 may perform shading and/or blending on the appended edges. Hence, without recreating the image of the artificial reality according to the updated sensor measurements, the processor 270 can generate the image of the artificial reality.

In some embodiments, the electronic display 275 is an electronic component that displays an image. The electronic display 275 may, for example, be a liquid crystal display or an organic light emitting diode display. The electronic display 275 may be a transparent display that allows the user to see through. In some embodiments, when the HWD 250 is worn by a user, the electronic display 275 is located proximate (e.g., less than 3 inches) to the user's eyes. In one aspect, the electronic display 275 emits or projects light towards the user's eyes according to image generated by the processor 270.

In some embodiments, the lens 280 is a mechanical component that alters received light from the electronic display 275. The lens 280 may magnify the light from the electronic display 275, and correct for optical error associated with the light. The lens 280 may be a Fresnel lens, a convex lens, a concave lens, a filter, or any suitable optical component that alters the light from the electronic display 275. Through the lens 280, light from the electronic display 275 can reach the pupils, such that the user can see the image displayed by the electronic display 275, despite the close proximity of the electronic display 275 to the eyes.

In some embodiments, the compensator 285 includes an electronic component or a combination of an electronic component and a software component that performs compensation to compensate for any distortions or aberrations. In one aspect, the lens 280 introduces optical aberrations such as a chromatic aberration, a pin-cushion distortion, barrel distortion, etc. The compensator 285 may determine a compensation (e.g., predistortion) to apply to the image to be rendered from the processor 270 to compensate for the distortions caused by the lens 280, and apply the determined compensation to the image from the processor 270. The compensator 285 may provide the predistorted image to the electronic display 275.

In some embodiments, the console 210 is an electronic component or a combination of an electronic component and a software component that provides content to be rendered to the HWD 250. In one aspect, the console 210 includes a wireless interface 215 and a processor 230. These components may operate together to determine a view (e.g., a FOV of the user) of the artificial reality corresponding to the location of the HWD 250 and the gaze direction of the user of the HWD 250, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, hand model data, mapping information for translating a location and an orientation of the HWD 250 in a physical space into a virtual space (or simultaneous localization and mapping (SLAM) data), eye tracking data, motion vector information, depth information, edge information, object information, etc. The console 210 may provide the image data and the additional data to the HWD 250 for presentation of the artificial reality. In other embodiments, the console 210 includes more, fewer, or different components than shown in FIG. 2. In some embodiments, the console 210 is integrated as part of the HWD 250.

In some embodiments, the wireless interface 215 is an electronic component or a combination of an electronic component and a software component that communicates with the HWD 250. The wireless interface 215 may be or correspond to the wireless interface 122. The wireless interface 215 may be a counterpart component to the wireless interface 265 to communicate through a communication link (e.g., wireless communication link). Through the communication link, the wireless interface 215 may receive from the HWD 250 data indicating the determined location and/or orientation of the HWD 250, and/or the determined gaze direction of the user. Moreover, through the communication link, the wireless interface 215 may transmit to the HWD 250 image data describing an image to be rendered and additional data associated with the image of the artificial reality.

The processor 230 can include or correspond to a component that generates content to be rendered according to the location and/or orientation of the HWD 250. In some embodiments, the processor 230 is implemented as a part of the processor 124 or is communicatively coupled to the processor 124. In some embodiments, the processor 230 may incorporate the gaze direction of the user of the HWD 250. In one aspect, the processor 230 determines a view of the artificial reality according to the location and/or orientation of the HWD 250. For example, the processor 230 maps the location of the HWD 250 in a physical space to a location within an artificial reality space, and determines a view of the artificial reality space along a direction corresponding to the mapped orientation from the mapped location in the artificial reality space. The processor 230 may generate image data describing an image of the determined view of the artificial reality space, and transmit the image data to the HWD 250 through the wireless interface 215. In some embodiments, the processor 230 may generate additional data including motion vector information, depth information, edge information, object information, hand model data, etc., associated with the image, and transmit the additional data together with the image data to the HWD 250 through the wireless interface 215. The processor 230 may encode the image data describing the image, and can transmit the encoded data to the HWD 250. In some embodiments, the processor 230 generates and provides the image data to the HWD 250 periodically (e.g., every 11 ms).

In one aspect, the process of detecting the location of the HWD 250 and the gaze direction of the user wearing the HWD 250, and rendering the image to the user should be performed within a frame time (e.g., 11 ms or 16 ms). A latency between a movement of the user wearing the HWD 250 and an image displayed corresponding to the user movement can cause judder, which may result in motion sickness and can degrade the user experience. In one aspect, the HWD 250 and the console 210 can prioritize communication for AR/VR, such that the latency between the movement of the user wearing the HWD 250 and the image displayed corresponding to the user movement can be presented within the frame time (e.g., 11 ms or 16 ms) to provide a seamless experience.

Figure 3:
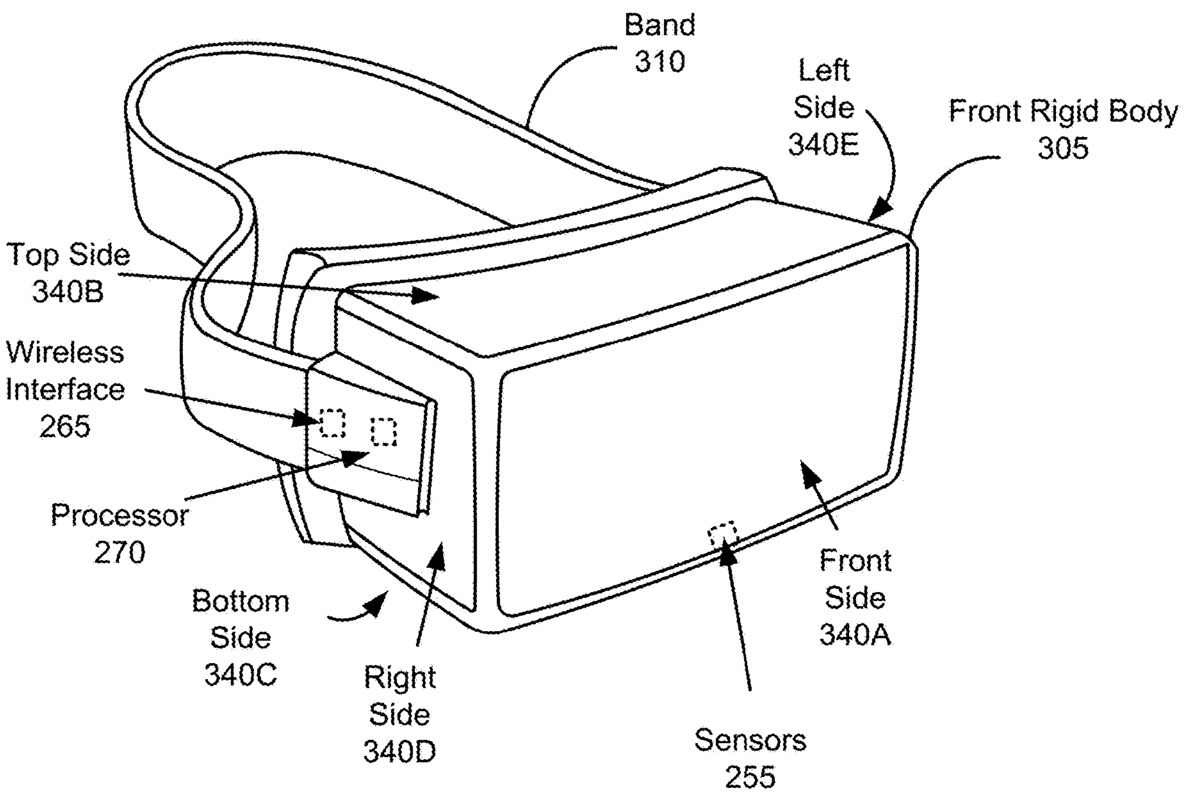
FIG. 3 is a diagram of a head wearable display, according to an example implementation of the present disclosure.

FIG. 3 is a diagram of a HWD 250, in accordance with an example embodiment. In some embodiments, the HWD 250 includes a front rigid body 305 and a band 310. The front rigid body 305 includes the electronic display 275 (not shown in FIG. 3), the lens 280 (not shown in FIG. 3), the sensors 255, the wireless interface 265, and the processor 270. In the embodiment shown by FIG. 3, the wireless interface 265, the processor 270, and the sensors 255 are located within the front rigid body 205, and may not be visible externally. In other embodiments, the HWD 250 has a different configuration than shown in FIG. 3. For example, the wireless interface 265, the processor 270, and/or the sensors 255 may be in different locations than shown in FIG. 3.

Figure 4:
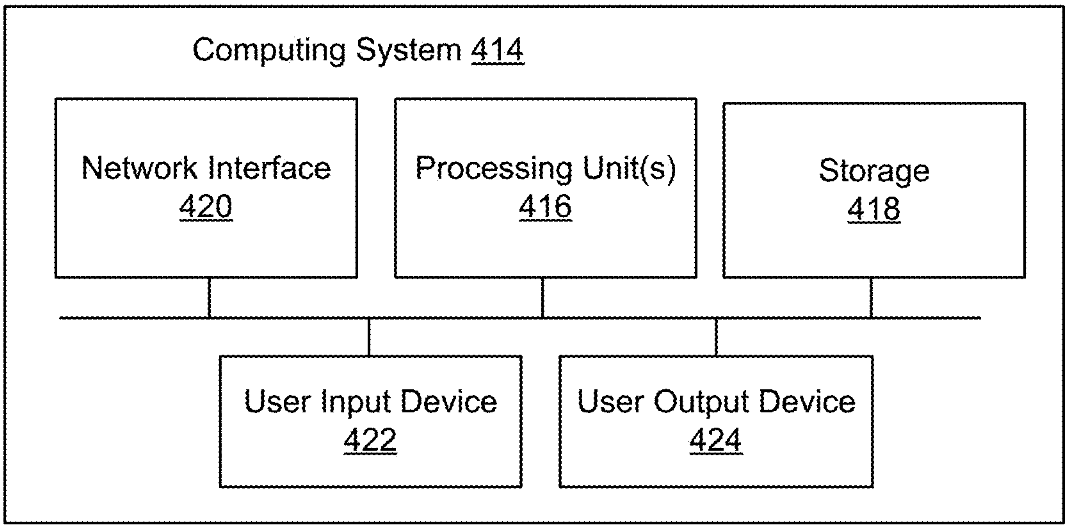
FIG. 4 is a block diagram of a computing environment according to an example implementation of the present disclosure.

Various operations described herein can be implemented on computer systems. FIG. 4 shows a block diagram of a representative computing system 414 usable to implement the present disclosure. In some embodiments, the source devices 110, the sink device 120, the console 210, the HWD 250 are implemented by the computing system 414. Computing system 414 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 414 can be implemented to provide VR, AR, MR experience. In some embodiments, the computing system 414 can include conventional computer components such as processors 416, storage device 418, network interface 420, user input device 422, and user output device 424.

Network interface 420 can provide a connection to a wide area network (e.g., the Internet) to which WAN interface of a remote server system is also connected. Network interface 420 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

The network interface 420 may include a transceiver to allow the computing system 414 to transmit and receive data from a remote device using a transmitter and receiver. The transceiver may be configured to support transmission/reception supporting industry standards that enables bi-directional communication. An antenna may be attached to transceiver housing and electrically coupled to the transceiver. Additionally or alternatively, a multi-antenna array may be electrically coupled to the transceiver such that a plurality of beams pointing in distinct directions may facilitate in transmitting and/or receiving data.

A transmitter may be configured to wirelessly transmit frames, slots, or symbols generated by the processor unit 416. Similarly, a receiver may be configured to receive frames, slots or symbols and the processor unit 416 may be configured to process the frames. For example, the processor unit 416 can be configured to determine a type of frame and to process the frame and/or fields of the frame accordingly.

User input device 422 can include any device (or devices) via which a user can provide signals to computing system 414; computing system 414 can interpret the signals as indicative of particular user requests or information. User input device 422 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 424 can include any device via which computing system 414 can provide information to a user. For example, user output device 424 can include a display to display images generated by or delivered to computing system 414. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 424 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 416 can provide various functionality for computing system 414, including any of the functionality described herein as being performed by a server or client, or other functionality associated with message management services.

It will be appreciated that computing system 414 is illustrative and that variations and modifications are possible. Computer systems used in connection with the present disclosure can have other capabilities not specifically described here. Further, while computing system 414 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Figure 5:
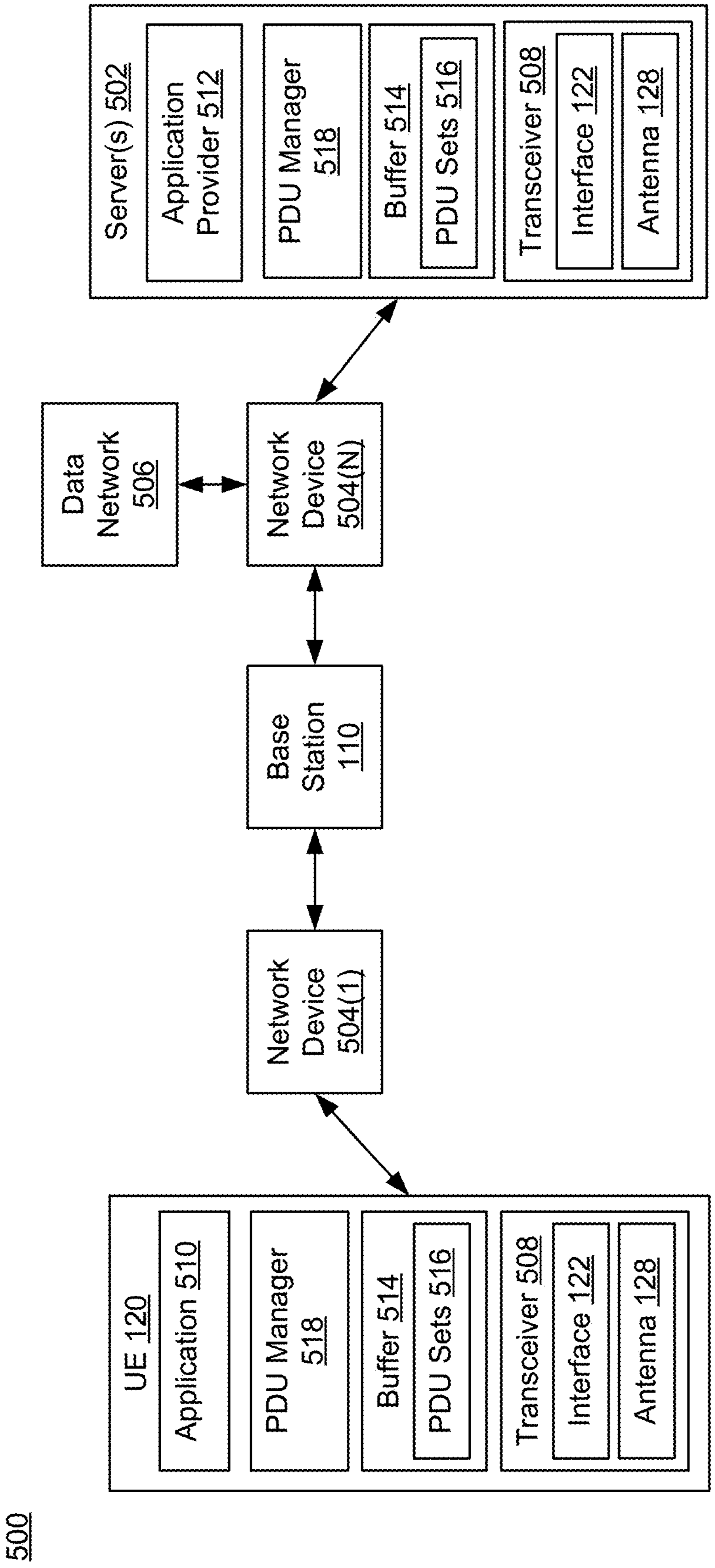
FIG. 5 is a block diagram of a system for protocol data unit (PDU) set discard, according to an example implementation of the present disclosure.

Referring now to FIG. 5, depicted is a block diagram of a system 500 for protocol data unit (PDU) discard policies, according to an example implementation of the present disclosure. The system 500 may include user equipment (UE) 120 communicably coupled to one or more server(s) 502. The UE 120 may be the same as or similar to the UE 120 described above with reference to FIG. 1. The UE 120 may be communicably coupled to the server(s) 502 via various network devices 504 and base station 110. The base station 110 may be the same as or similar to the base station 110 described above with reference to FIG. 1. The network devices 504 may be or include any networking device, component, or node along the network path between the UE 120 and server(s) 502. For example, the network devices 504 may include routers, switches, or any other network nodes. In various embodiments, the server(s) 502 may be configured to communicate with a data network 506 (e.g., a trusted data network 506) via a network exposure function and/or policy control function). The server(s) 502 may be configured to communicate data via a user plane function (UPF) to the base station 110 (e.g., a radio access network [RAN]), and the base station 110 may route the data from the server(s) 502 via various network devices 504 to the UE 120. The UE 120, server(s) 502, base station 110, and network devices 504 may include one or more transceivers 508, which may be or include an interface 112, 122 (similar to the wireless interface 112, 122 described above with reference to FIG. 1) and an antenna 118, 128 (similar to the antenna(s) 118, 128 described above with reference to FIG. 1). The transceiver(s) 508 may be configured to facilitate wireless communication along the network path between the endpoints (e.g., the UE 120 and server(s) 502).

The UE 120 may be configured to execute an application 510 hosted by an application provider 512 on the server(s) 502. In various embodiments, the application 510 may be an extended reality (XR) application (e.g., an augmented reality (AR), virtual reality (VR), mixed reality (MR), or other XR application). The application 510 executing on the UE 120 may generate data for transmission to the server 502 (and vice versa). The UE 120 (or server 502) may be configured to transmit the data (e.g., via the transceivers 508) along the network path shown in FIG. 5 and described above to the endpoint or destination (e.g., to the server 502 or UE 120). As described in greater detail below, the generated data may be temporarily stored in a buffer 514 as protocol data unit (PDU) sets 516, for transmission along the network path to the endpoint/destination.

Figure 6:
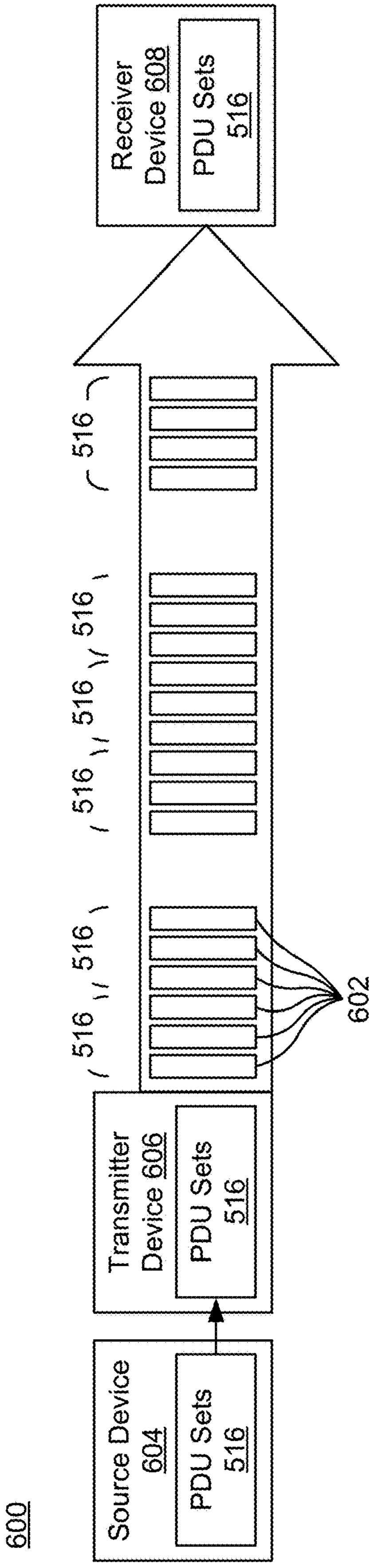
FIG. 6 is a diagram of a traffic flow from a source device to a receiver device, according to an example implementation of the present disclosure.

Referring to FIG. 6, together with FIG. 5, depicted in FIG. 6 is a diagram of traffic flow 600 for sending PDUs 602 of a PDU set 516 from a source device 604 via a transmitter device 606 to a receiver device 608, according to an example implementation of the present disclosure. The source device 604 may be or include the device/component/processor/hardware which generate, configure, establish, or otherwise produce PDUs 602 of the PDU set 516. For example, the source device 604 may be or include a processor of the UE 120 and/or server 502 (e.g., at the application layer). The transmitter device 606 may be or include any device, component, element, or hardware along the network path between the source device 604 and the receiver device 608. For example, assuming that the source device 604 is the processor(s) of the UE 120 at the application layer executing the application 610, the transmitter device 606 may be or include the transceiver 508 of the UE 120 (e.g., at a physical layer of the UE 120), or any other transceiver or transmitter device 606 along the network path (e.g., at the network devices 504, base station 110). The receiver device 608 may be or include the device upstream from the source device. For example, the receiver device 608 may be or include a next-in-line device along the network path to which the transmitter device 606 is to transmit the PDU sets 516. In this regard, the receiver device 608 may be any device upstream from the transmitter device 606 including, but not limited to, the device corresponding to the ultimate destination for the PDU sets (e.g., the server 502 where the UE 120 comprises the source device, or vice versa).

As shown in FIG. 6, the traffic flow 600 may include protocol data units (PDUs) 602 which may be grouped or otherwise sent in a PDU set 516. In some embodiments, a source (or sender/originator) device 606 may generate a PDU set 516 including one or more PDUs 602. Each PDU 602 may include, contain, or otherwise carry various unit(s) of information generated at the application level (e.g., by the application 510, for example). For example, where the application 510 is an XR application, a PDU 602 may include a frame or video slice for the XR application. In some implementations, each of the PDUs 602 in the PDU set 516 are needed by the application 510 (or the receiver device 608) to use the corresponding unit of information.

As shown in FIG. 6, the source device 604 may be configured to generate the PDUs 602 of the PDU set 516, and the source device 604 may transmit, communicate, or otherwise provide the PDU sets 516 to a transmitter device 606 for transmission the receiver device 608. In some embodiments, the source device 604 and the transmitter device 606 may be embodied on the same device. For example, the source device 604 may include one or more processors at an application layer of the UE 120 (e.g., executing the application 510), and the transmitter device 606 may include the transceiver 508 at a physical layer of the UE 120.

Referring back to FIG. 5, in various embodiments, a device or node along the network path may include a PDU manager 518. The PDU manager 518 may be or include any device, component, element, or hardware designed or configured to implement, deploy, use, or otherwise manage a PDU set policy. While shown as included in the UE 120 and server(s) 502, in various embodiments, each node (e.g., the network devices 504, base station 410, data network 506, etc.) may execute or include an instance of the PDU manager 518. In some embodiments, the PDU manager 518 (e.g., of a source device 604) may be configured to select, configure, establish, or otherwise provide discard levels for PDU sets 516. For example, the PDU manager 518 may be configured to provide a discard level for each PDU set 516, where the discard level is selected from a plurality of discard levels (e.g., non-binary discard levels, three or more discard levels, an ordered set of discard levels). The PDU manager 518 may be configured to provide the discard level for each PDU set 516 based on or according to one or more characteristics of the traffic which corresponds to (e.g., is carried in) the PDUs 602 of the PDU set 516. As described in greater detail below, the PDU manager 518 (e.g., of a source device 604) may be configured to provide the discard level, such that a transmitter device 606 may be configured to selectively discard PDU sets 516 based on the discard level during network congestion.

The PDU manager 518 may be configured to select, determine, define, configure, establish, or otherwise apply the discard level for PDU sets 516. The PDU manager 518 may be configured to determine the discard level based on or according to characteristic(s) of traffic included/carried in PDUs 602 of the PDU set 516. In some embodiments, the characteristics may be or include a traffic type. The traffic type may indicate or correspond to a data rate of the traffic, a reliability-sensitivity of the traffic (e.g., how sensitive the traffic is to dropped packet), a latency-sensitivity of the traffic (e.g., how sensitive the traffic is to delay/latency). For example, some traffic (such as audio traffic) may have high data rates, but may be less sensitive to latency. As another example, some traffic (such as control traffic) may have low data rates, but may be sensitive to reliability.

The PDU manager 518 may be configured to determine the discard level by mapping a traffic type of traffic included in the PDUs 602 of the PDU set 516 to a corresponding discard level. For example, the PDU manager 518 may be configured to determine the traffic type based on explicit signaling from the application layer, from packet/PDU inspection, metadata associated with the PDUs/PDU set 516, a protocol used for the PDU etc. The PDU manager 518 may be configured to assign a PDUs 602 of the PDU set 516 a discard level which is associated with the traffic type. For example, the PDU manager 518 may be configured to perform a look-up using the traffic type of a PDU 602 in a data structure, to determine the corresponding discard level. The data structure may store or include a table which identifies traffic types and corresponding discard levels. An example of a data structure, which shows characteristics of traffic, examples of traffic types, discard levels, and corresponding discard criteria, is shown in Table 1 below.

TABLE 1

Example Discard Levels for Traffic Types

| Characteristics | Example Traffic Types | Discard Level | Discard Criteria |
|---|---|---|---|
| High Data Rate | Video Streaming, Large File Transfers, High-Resolution Gaming | 1 | Discard Irrespective of Importance |
| High Importance (Reliability) | Real-Time Gaming, Interactive Media, Financial Trading Platform Traffic, Autonomous Vehicles, Emergency Communication Services | 3 | Discard after Discard Levels 1 and 2 |
| Low Latency | Voice over IP, Video Conferencing, Remote Desktop Services, Control Traffic | 2 | Discard after Level 1 |

The PDU manager 518 may be configured to apply the discard level to PDU sets 516. In some embodiments, the PDU manager 518 may be configured to apply the discard level to each of the PDUs 602 in a PDU set 516. As another example, the PDU manager 518 may be configured to apply the discard level to at least one of the PDUs 602 in a PDU set 516 (such as a first PDU 602 of the PDU set 516), where the same discard level is indicated/applicable across each of the PDUs 602 in the PDU set 516. The PDU manager 518 may be configured to apply the discard level to the PDU sets 516 by indicating the discard level in a packet/PDU header or other information element of the PDU 602.

Once the discard level is applied to PDU sets 516, PDU managers 518 of transmitter devices 606 along the network path may apply a discard policy to selectively discard PDU sets 516 based on the discard level and/or a discard timer, according to network congestion. For example, and as described with reference to FIG. 7 below, as network congestion is experienced/increases, a PDU manager 518 may be configured to discard PDU sets 516 based on or according to the discard level assigned to the PDU sets 516. Where network congestion is reduced to less than (or equal to) a threshold (e.g., a packet drop/loss which is less than or equal to a minimum packet drop/loss, throughput is greater than or equal to a threshold throughput, etc.), the PDU managers 518 may be configured to discard PDU sets 516 according to a discard time. For example, the discard time may define an upper bound for the time that a PDU set 516 may be delayed for both downlink (DL) and/or uplink (UL) traffic. The discard time may be different (or the same) for different PDU sets. For example, like the discard level, the discard time may vary based on the traffic type to, e.g., reduce network congestion. The PDU manager 518 may be configured to execute a PDU set discard timer (PSDT) in instances in which the network congestion is not experienced. The PSDT may measure, quantify, calculate, or otherwise signal the time that a PDU set 516 has been waiting for transmission (e.g., in a buffer 514) at the transmitter device 606. The PDU managers 518 may be configured discard PDU sets 516 where a time period of window in which a PDU set 516 is in a buffer 514 satisfies the discard time (e.g., the time indicated by the PSDT is greater than the discard time).

The PDU manager 518 of a transmitter device 606 may be configured to detect, identify, or otherwise determine a congestion status of the network. In some embodiments, the PDU manager 518 may detect network congestion based on RRC signaling. For instance, during congestion periods, the PDU manager 518 may receive RRC connection rejection(s) from a base station (e.g., base station 110) which include or indicate congestion. In some embodiments, the PDU manager 518 may detect network congestion based on physical layer indicators, such as observing high interference levels or reduced signal quality, which may indicate/identify reflect high traffic volume and potential network congestion. Further, in some embodiments, the PDU manager 518 may utilize downlink/uplink data throughput measurements as an indicator of network congestion. For example, the PDU manager 518 may be configured to determine or identify network congestion responsive to a sudden drop in throughput. Additionally, in some embodiments, the PDU manager 518 may be configured to receive network-reported load indicators or explicit congestion notifications (ECNs) delivered through system information broadcasts or dedicated signaling to determine real-time network load conditions indicative of network congestion.

The PDU manager 518 may be configured to execute a PDU set discard policy based on or according to a congestion status of the network. In some embodiments, the PDU set discard policy may instruct or indicate that the PDU manager 518 is to discard PDU sets 516 based on or according to the discard time (e.g., using the PSDT) where the congestion status of the network satisfies one or more uncongested threshold criterion (e.g., a throughput greater than a threshold, an absence of load indicators or ECNs for a threshold time period, an interference level which is less than a threshold interference, and so forth). In some embodiments, the PDU set discard policy may instruct or indicate that the PDU manager 518 is to discard PDU sets 516 based on or according to the discard level where the congestion status of the network satisfies one or more congested threshold criterion (e.g., a throughput less than a threshold, a count of load indicators or ECNs exceeding a threshold for a given time period, an interference level which is greater than a threshold interference, and so forth). The PDU manager 518 may be configured to apply the PDU set discard policy to the network conditions (e.g., the congestion status of the network), to determine a manner in which to discard PDU sets 516. The PDU manager 518 may be configured to discard PDU sets 516 based on the network conditions as applied to the PDU set discard policy.

Figure 7:
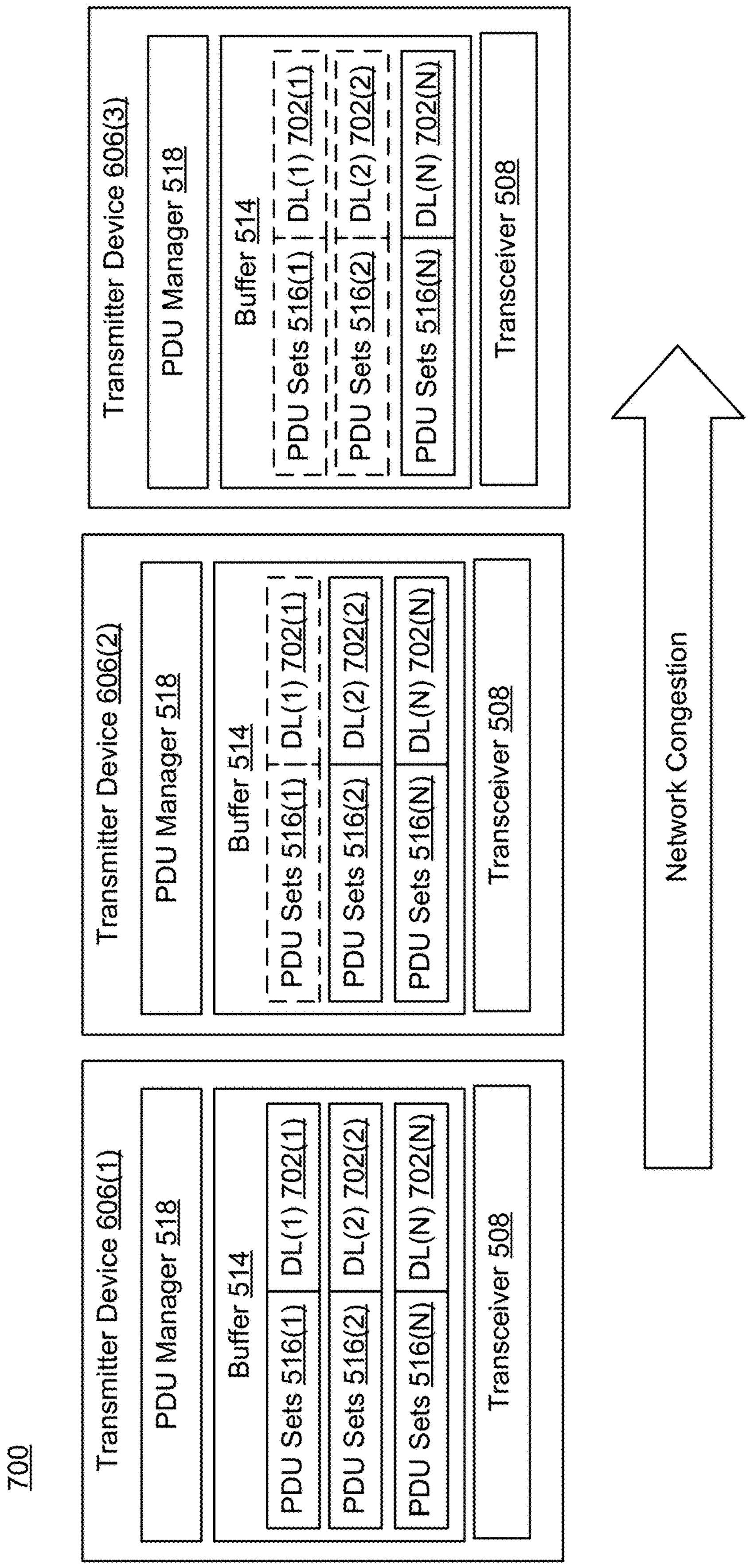
FIG. 7 is a diagram showing PDU set discarding based on network congestion, according to an example implementation of the present disclosure.

Referring to FIG. 5 and FIG. 7, the PDU manager 518 may be configured to discard PDU sets 516 based on or according to the network congestion. Specifically, FIG. 7 is a diagram illustrating PDU set 516 discarding based on network congestion, according to an example implementation of the present disclosure. As shown in FIG. 7, a transmitter device 606 may include a plurality of PDU sets 516 in the buffer, each with a corresponding discard level 702 assigned thereto. The PDU sets 516 may include a first set (or subset) of PDU sets 516(1) having a first discard level 702(1), a second set (or subset) of PDU sets 516(2) having a second discard level, through an n-th set (or subset) of PDU sets 516(N) having an n-th discard level.

As shown in FIG. 7, as network congestion increases, the transmitter device 606 may be configured to discard different PDU sets 516. For example, at a first time instance (e.g., the transmitter device 606(1) at the first time instance), where congestion is limited/reduced/below a threshold, the PDU manager 518 may be configured to discard PDU sets according to a discard time. At a second time instance (e.g., the transmitter device 606(2) at the second time instance), as network congestion is experienced/increases, the PDU manager 518 may be configured to discard PDU sets 516 according to the discard level. In this example, the PDU manager 518 may be configured to discard a subset of PDU sets 516(1) which were assigned a first discard level 702(1), but may transmit the remaining PDU sets 516(2)-516(N) which were assigned the second through n-th discard level 702(1)-702(N). At a third time instance (e.g., the transmitter device 606(3) at the third time instance), as network congestion is experienced/increases, the PDU manager 518 may be configured to discard additional subsets of the PDU sets 516(1)-516(2) which were assigned the first discard level 702(1) and the second discard level 702(2). However, the PDU manager 518 may transmit the remaining PDU sets 516(N) which were assigned the n-th discard level 702(N).

While described as the same transmitter device 606 at different time instances, it is noted that the same scenario may apply to different transmitter devices 606 along the network path. For example, where the UE 120 is includes the source device 604 which generated the PDU sets, the transmitter device 606(1) may be the transceiver 508 of the UE 120, the transmitter device 606(2) may the base station 110, and the transmitter device 606(3) may be the N-th network device 504(N).

Figure 8:
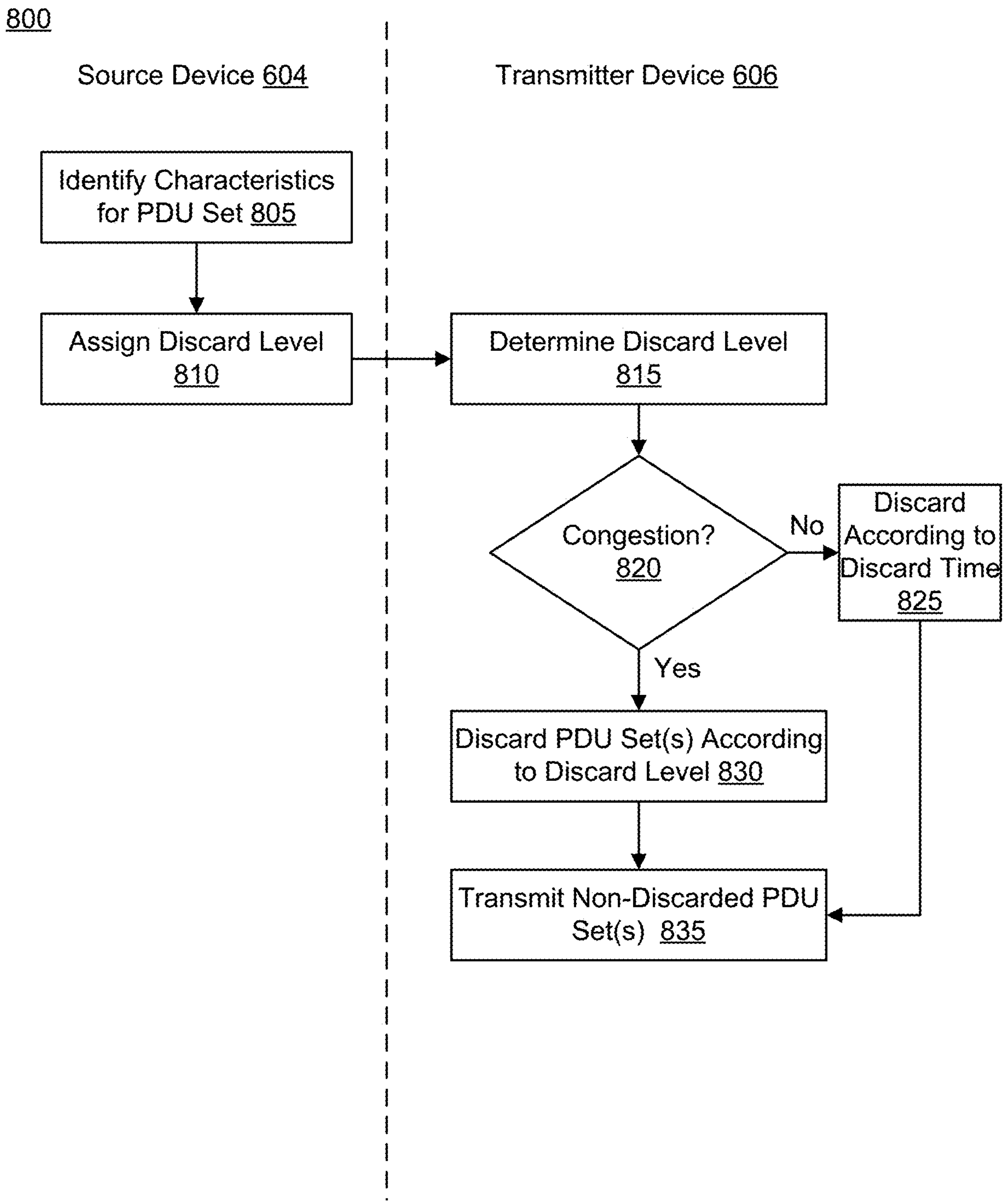
FIG. 8 is a flowchart showing an example method for PDU set discard, according to an example implementation of the present disclosure.

FIG. 8 is a flowchart showing an example method 800 for PDU set discard, according to an example implementation of the present disclosure. The method 800 may be performed or executed by the devices, components, elements, or hardware described above with reference to FIG. 1-FIG. 7. As a brief overview, at step 805, a source device 604 may identify characteristics for a protocol data unit (PDU) set. At step 810, the source device 604 may assign a discard level. At step 815, a transmitter device 606 may determine the discard level. At step 820, the transmitter device 606 may determine a congestion status. At step 825, the transmitter device 606 may discard PDU sets according to a discard time. At step 830, the transmitter device 606 may discard PDU sets according to the discard level. At step 835, the transmitter device 606 may transmit non-discarded PDU sets.

At step 805, a source device 604 may identify characteristics for a PDU set. In some embodiments, prior to identification of the characteristics for the PDU set, the source device 604 may generate, configure, establish, produce, or otherwise provide the PDUs of the PDU set. For example, the source device 604 may provide the PDUs as part of, in support of, or in connection with executing an application that leverages or uses the wireless network for transmission of traffic to an endpoint. The PDUs may carry various types/forms of traffic. For example, the PDUs may carry any of the types of traffic provided as examples in Table 1 above. The characteristics may include, but are not limited to, a data rate, a reliability-sensitivity, or a latency-sensitivity of the traffic carried in the PDUs. In some embodiments, as part of generating the PDUs, the source device 604 may identify the characteristics for the PDU set. In some embodiments, following generating the PDUs, the source device 604 may identify the characteristics for the PDU set.

At step 810, the source device 604 may assign a discard level. The source device 604 may assign the discard level to PDU sets, based on or according to the characteristics determined at step 805. In some embodiments, the source device 604 may assign a discard level to each PDU of the PDU set. In some embodiments, the source device 604 may assign a discard level to one or more of the PDUs of the PDU set, where that same discard level is applicable across all of the PDUs of the PDU set. For example, the source device 604 may assign a discard level to the first PDU of the PDU set. Continuing this example, a transmitter device may identify the discard level of the first PDU of the PDU set and apply the discard level of the first PDU to each of the remaining PDUs of the PDU set. In some embodiments, the source device 604 may assign a discard level to the PDU set, where the discard level is applicable to each of the PDUs within the PDU set.

In some embodiments, the source device 604 may assign a discard level from an ordered set of a plurality of discard levels. For example, the source device 604 may assign a discard level from a first, second, third, through n-th discard level. In this regard, the discard levels may be non-binary, and instead identify a level/ranking in which PDUs are to be discarded. The discard levels may indicate a ranking in which PDU sets are to be discarded, relative to other PDU sets. For example, a first discard level may indicate to discard a corresponding PDU set irrespective of a PDU set importance (PSI) assigned to the corresponding PDU set, a second discard level may indicate to discard a corresponding PDU set following discarding of PDU sets assigned the first discard level, and a third discard level may indicate to discard a corresponding PDU set following discarding of PDU sets assigned the second discard level. In other words, after the first discard level, n-th discard level may indicate to discard a corresponding PDU set following discarding of PDU sets assigned the (n−1)-th discard level.

Following assigning PDU sets a discard level, the source device 604 may transmit, send, share, communicate, or otherwise provide the PDU sets (e.g., with the assigned discard level) to a transmitter device 606. In some embodiments, the source device 604 may provide the PDU sets locally to the transmitter device 606. In other words, the source device 604 and the transmitter device 606 may reside on or be included in the same device. For example, the source device 604 may reside at an application layer of a device, and the transmitter device 606 may reside at a different layer (such as a physical layer) of the same device. In some embodiments, the source device 604 may provide the PDU set over a wireless communication medium to the transmitter device 606. For example, the source device 604 may be a UE 120, and the transmitter device 606 may be any other device downstream along the network path between the UE 120 and the receiving device 608 (which may or may not be the application server 502).

At step 815, a transmitter device 606 may determine the discard level. In some embodiments, the transmitter device 606 may determine the discard level assigned to a plurality of PDU sets. The transmitter device 606 may determine the discard level for each of the PDU sets it receives from an upstream device, such as the source device 604 or any intervening transmitter device(s) 606. The transmitter device 606 may determine the discard level responsive to receiving the PDU sets. The transmitter device 606 may determine the discard level by inspecting, e.g., metadata, header information, or other bits/bytes of information which indicates the discard level of a PDU set.

At step 820, the transmitter device 606 may determine a congestion status. In some embodiments, the transmitter device 606 may determine the congestion status of the network which is to be used to transmit the PDU sets to a downstream device (such as the receiver device or any other next-in-line device along the network path). The transmitter device 606 may be configured to determine the congestion status based on or according to a throughput of the network, based on signaling or messaging received from the network (e.g., explicit congestion notification, or any other type of signaling), based on packet drops or losses, measured interference, etc. Where, at step 820, the transmitter device 606 determines that the congestion status indicates that the network is not congested, the method 800 may proceed to step 825, where the transmitter device 606 discards PDU sets according to a discard time (e.g., using a PDU set discard timer (PDST)), where the discard time may be set according to the type of traffic/characteristics of traffic, and so forth. Where, at step 820, the transmitter device 606 determines that the congestion status indicates that the network is congested, the method 800 may proceed to step 830.

At step 830, the transmitter device 606 may discard PDU sets according to the discard level. In some embodiments, the transmitter device 606 may discard PDU sets by purging at least some of the PDU sets from a buffer of the transmitter device 606, according to the discard level. The transmitter device 606 may discard various subset(s) of PDU sets according to the discard level assigned to/set for/defined for the PDU sets. For example, the transmitter device 606 may discard a first subset of PDU sets according to a first discard level assigned to the first subset. As congestion increases or persists, the transmitter device 606 may discard additional subset(s) of PDU sets according to the discard level. For example, the transmitter device 606 may discard the first subset of PDU sets and a second subset of PDU sets which are assigned a second discard level. In this regard, the transmitter device 606 may discard subsets of PDU sets, in order, according to the discard level assigned to the PDU sets from the ordered set of discard levels.

At step 835, the transmitter device 606 may transmit non-discarded PDU sets. In some embodiments, the transmitter device may transmit, via the network to the receiver device, non-discarded subsets of the PDU sets. For example, where the first subset of PDU sets (e.g., having the first discard level) are discarded, the transmitter device 606 may transmit the second through n-th PDU sets which are assigned the second through n-th discard levels. The transmitter device 606 may transmit the non-discarded PDU sets to the receiver device, whereby the receiver device may repeat the same steps 815-835 based on the congestion level, until the non-discarded PDU sets are received at their ultimate destination.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method, comprising:

determining, by a transmitter device, for each of a plurality of protocol data unit (PDU) sets, a discard level, from an ordered set of a plurality of discard levels, assigned to the PDU set, the discard level assigned to the PDU set based on one or more characteristics of traffic corresponding to the PDU set, the one or more characteristics comprising a traffic type of the PDU set;

determining, by the transmitter device, a congestion status of a network which is to be used to transmit the PDU sets to a receiver device;

discarding, by the transmitter device, a first subset of the plurality of PDU sets, according to a first discard level assigned to the first subset; and transmitting, by the transmitter device, via the network to the receiver device, a second subset of the plurality of PDU sets having a second discard level.

2. The method of claim 1, wherein the ordered set of the plurality of discard levels comprises the first discard level, the second discard level, and a third discard level.

3. The method of claim 1, wherein discarding the first subset of the plurality of PDU sets comprises purging the first subset from a buffer of the transmitter device.

4. The method of claim 1, wherein the transmitter device comprises at least one of a user equipment (UE) or a base station.

5. The method of claim 1, wherein the discard level is assigned to the PDU set at an application layer of a user equipment (UE), and the UE comprises the transmitter device, which corresponds to a physical layer of the UE.

6. The method of claim 1, wherein the discard level is assigned by a source device, comprising at least one of a user equipment (UE) or an application server, and wherein the transmitter device comprises a network node along a network path between the UE and the application server.

7. The method of claim 1, wherein the first discard level indicates to discard a corresponding PDU set irrespective of a PDU set importance (PSI) assigned to the corresponding PDU set, the second discard level indicates to discard a corresponding PDU set following discarding of PDU sets assigned the first discard level, and a third discard level indicates to discard a corresponding PDU set following discarding of PDU sets assigned the second discard level.

8. The method of claim 1, wherein the one or more characteristics comprise at least one of a data rate, a reliability-sensitivity, or a latency-sensitivity.

9. The method of claim 1, further comprising transmitting, by the transmitter device, via the network to the receiver device, a third subset of the plurality of PDU sets having a third discard level.

10. A transmitter device, comprising:

a wireless transceiver; and one or more processors configured to:

determine, for each of a plurality of protocol data unit (PDU) sets, a discard level, from an ordered set of a plurality of discard levels, assigned to the PDU set, the discard level assigned to the PDU set based on one or more characteristics of traffic corresponding to the PDU set, the one or more characteristics comprising a traffic type of the PDU set;

determine a congestion status of a network which is to be used to transmit the PDU sets to a receiver device;

discard a first subset of the plurality of PDU sets, according to a first discard level assigned to the first subset; and transmit, via the wireless transceiver and the network to the receiver device, a second subset of the plurality of PDU sets having a second discard level.

11. The transmitter device of claim 10, wherein the ordered set of the plurality of discard level comprises the first discard level, the second discard level, and a third discard level.

12. The transmitter device of claim 10, wherein the one or more processors are configured to discard the first subset of the plurality of PDU sets by purging the first subset from a buffer of the transmitter device.

13. The transmitter device of claim 10, wherein the discard level is assigned to the PDU set at an application layer of a user equipment (UE), and the UE comprises the transmitter device, which corresponds to a physical layer of the UE.

14. The transmitter device of claim 10, wherein the discard level is assigned by a source device, comprising at least one of a user equipment (UE) or an application server, and wherein the transmitter device comprises a network node along a network path between the UE and the application server.

15. The transmitter device of claim 10, wherein the first discard level indicates to discard a corresponding PDU set irrespective of a PDU set importance (PSI) assigned to the corresponding PDU set, the second discard level indicates to discard a corresponding PDU set following discarding of PDU sets assigned the first discard level, and a third discard level indicates to discard a corresponding PDU set following discarding of PDU sets assigned the second discard level.

16. The transmitter device of claim 10, wherein the one or more processors are further configured to transmit, via the wireless transceiver and the network to the receiver device, a third subset of the plurality of PDU sets having a third discard level.

17. At least one of a base station, network device, or user equipment (UE), comprising the transmitter device of claim 10.

18. A non-transitory computer readable medium storing instructions that, when executed by one or more processors of a transmitter device, cause the transmitter device to:

determine, for each of a plurality of protocol data unit (PDU) sets, a discard level, from an ordered set of a plurality of discard levels, assigned to the PDU set, the discard level assigned to the PDU set based on one or more characteristics of traffic corresponding to the PDU set, the one or more characteristics comprising a traffic type of the PDU set;

determine a congestion status of a network which is to be used to transmit the PDU sets to a receiver device;

discard a first subset of the plurality of PDU sets, according to a first discard level assigned to the first subset; and transmit, via a wireless transceiver and the network to the receiver device, a second subset of the plurality of PDU sets having a second discard level.

19. The non-transitory computer readable medium of claim 18, wherein the instructions further cause the transmitter device to transmit, via the wireless transceiver and the network to the receiver device, a third subset of the plurality of PDU sets having a third discard level.

20. The non-transitory computer readable medium of claim 19, wherein the first discard level indicates to discard a corresponding PDU set irrespective of a PDU set importance (PSI) assigned to the corresponding PDU set, the second discard level indicates to discard a corresponding PDU set following discarding of PDU sets assigned the first discard level, and the third discard level indicates to discard a corresponding PDU set following discarding of PDU sets assigned the second discard level.

* * * * *